Dec. 20, 1927.
E. FOERSTER
SAW TOOTH
Filed March 17, 1927
1,653,265
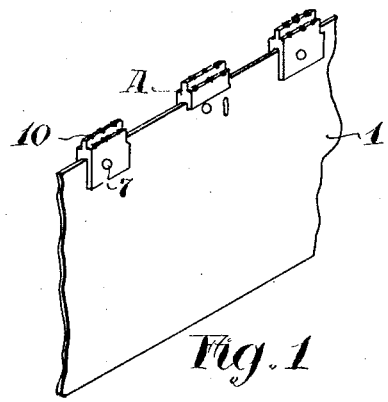
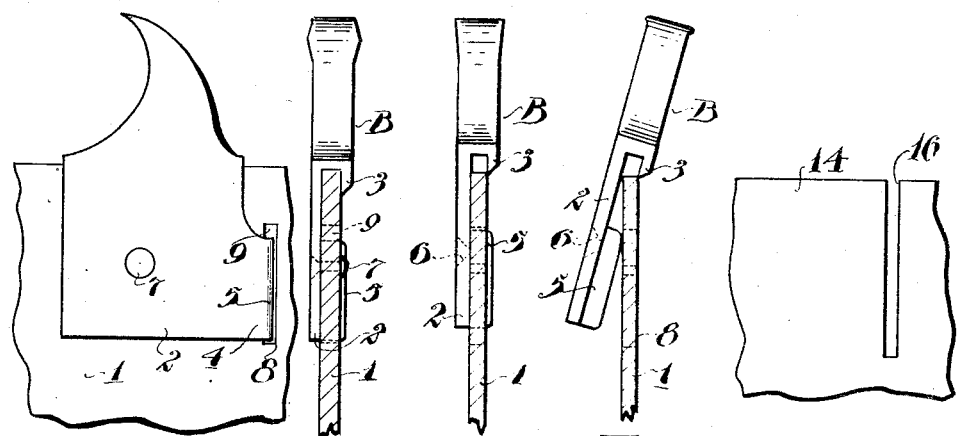
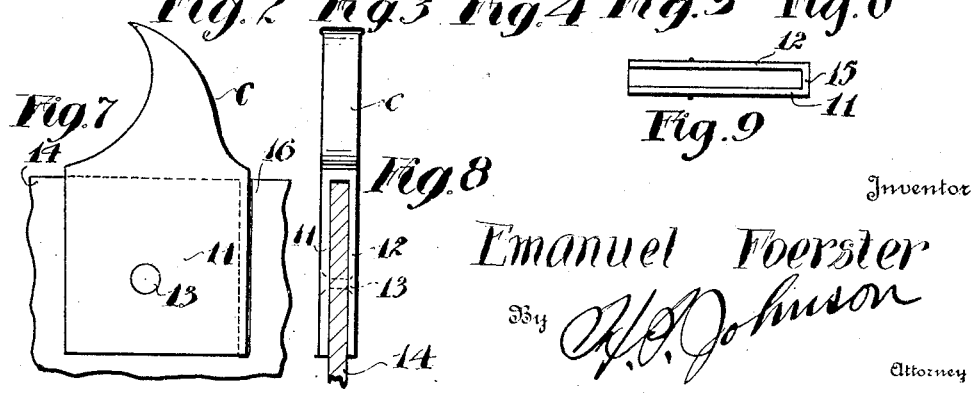
Inventor
Emanuel Foerster
By H. O. Johnson
Attorney Patented Dec. 20, 1927.

1,653,265

UNITED STATES PATENT OFFICE.

EMANUEL FOERSTER, OF ST. PAUL, MINNESOTA.

SAW TOOTH.

Application filed March 17, 1927. Serial No. 176,012.

The present invention relates to a removable saw tooth.

In the construction of large saws, it is usually desirable to make the teeth separately from the blade and to mount the teeth upon the blade by suitable means which will firmly anchor the teeth to the blade. Various constructions have been employed to mount saw teeth upon a blade, but it has been found that where the anchorage of the tooth entails a close fit between the ends of the tooth and a corresponding recess in the blade, that the pressing of the teeth into the blade causes a distortion of the periphery of the blade necessitating that the blade be hammered true before it can be put into use.

An object of the present invention is to make a removable saw tooth which may be firmly anchored to a supporting blade member.

In order to attain this object, there is provided, in accordance with one feature of the invention, a saw tooth having a recess therein for receiving a saw blade therein and having an offset portion to engage a recess in the saw blade and having an opening therein to receive a rivet by means of which the saw tooth can be securely anchored to the saw blade.

These and other features of the invention will be more fully brought out in the following description and the accompanying drawings, wherein:

Figure 1, is a view in perspective of a portion of a blade having teeth made in accordance with the present invention mounted thereon.

Figure 2, is a view in side elevation of a portion of a saw blade with a single tooth mounted thereon.

Figure 3, is a view in end elevation of the structure shown in Figure 2.

Figure 4, is a view similar to Figure 3, with a fastening rivet removed and the tooth raised upwardly to release it from engagement with the blade.

Figure 5, is a view similar to Figure 4 with the tooth tilted sideways to release it from engagement with the blade.

Figure 6, is a view in side elevation of a portion of a blade with a slot therein for holding a modified form of tooth;

Figures 7 and 8, are views in side and end elevation, respectively, of the modified form of tooth mounted upon the blade shown in Figure 6, and Figure 9, is a view in bottom elevation of the tooth shown in Figure 7 and 8 as it would appear when removed from the blade.

Referring to the drawings in detail, a saw blade 1 is illustrated in Figure 1, having teeth A mounted thereon. The teeth A illustrated in position on the blade in Figure 1 are of the diamond studded variety, such as are employed in cutting stone, while teeth B and C, shown in the remainder of the figures, are of a type used in cutting wood. In the structure illustrated in Figures 2 to 5, inclusive, the teeth are formed with a slot milled in the lower face thereof of a width to form sides 2 and 3 which are spaced to closely receive the saw blade 1 therebetween. One side 3 is shortened to permit the tooth to be readily mounted upon, or removed from, the blade. The rear end of the longer side 2 of the tooth B is bent over as at 5 to form an interlocking lug which engages a slot 8 in the blade to retain the tooth against displacement. In mounting the teeth upon the blade, each tooth is first placed in position upon the blade 1 as shown in Figures 1 to 3, inclusive, and the sides of the tooth forced together to firmly grip the blade between the sides of the tooth. It has been found that the teeth will function with no other fastening means than the grip produced by this squeezing of the sides together, but as an additional precaution the teeth may be soldered or riveted to the blade. A countersunk hole 6 is drilled in the longer side 2 of the tooth through which a rivet 7 may be inserted to pass through an opening drilled in the saw blade 1, the rivet being headed on the other side of the blade 1 from the countersunk head in the side of the tooth 2. The slot 8 is cut in the blade 1 to receive the bent over portion 5 of the tooth and is of a size to leave a clearance 9 above the top of the bent over portion 5 when the tooth is in position on the blade. The clearance between the upper edge of the bent over portion 5 and the top of the slot 8 is sufficient to permit the tooth to be raised to bring the short side 3 of the tooth clear of the top of the blade 1, when replacing a tooth.

To remove a tooth from position upon the blade, as for sharpening or replacement, the rivet, or other fastening means, is first removed and the tooth is then raised upwardly to the position shown in Figure 4. This brings the short side 3 of the tooth clear of the top of the blade and permits the tooth to be tilted at an angle, as shown in Figure 5, to release the bent over portion 5 from engagement with the slot 8. To affix a tooth in position upon a blade the process is reversed.

The base portion of the tooth shown in Figure 1 is of the same general construction as that of the base portion of the teeth shown in Figures 2 to 5, inclusive, but the upper portion of the tooth in Figure 1 is studded with pieces of bortz 10, or diamonds, as illustrated, to provide for the cutting of stone and other hard substances.

A modified construction is shown in Figures 7 to 9, inclusive. Here the tooth is milled or channeled out on the bottom to provide sides 11 and 12 which are of equal length, the space between the sides being of a width to receive a blade 14 therein. The ends of the sides 11 and 12 are brought together as at 15 to form a transverse end portion. To mount this type of tooth upon a blade the end portion 15 is slidably inserted in a slot 16 provided in the blade 14 and the sides of the tooth forced together to firmly grip the blade therebetween. The tooth may be further secured to the blade by means of a countersunk rivet 13, or by soldering.

Applicant is aware that it is not new to mount removable teeth in a blade to form a saw, but what is believed to be novel, as defined in the appended claims, is a removable saw tooth which, while it is firmly anchored to the blade, does not depend for such anchoring upon a close squeeze fit between the ends of the tooth and adjacent blade surfaces.

I claim:

1. In combination with a blade having a slot therein, a saw tooth having a recess in the bottom thereof to receive said blade, and a transversely extending portion connected to one side of the tooth and positioned to enter the slot in said blade, said slot being of sufficient width to freely admit said portion.

2. In combination with a blade having a slot therein, a saw tooth having a pair of sides spaced apart to receive said blade therebetween, a transversely extending portion connected to one of said sides to enter said slot, said sides being arranged to be compressed upon receiving the blade therebetween to anchor the tooth to the blade.

3. In combination with a blade having a slot therein, a saw tooth having a long side and a short side spaced apart to receive said blade therebetween, a transverse portion carried by said long side and constructed to freely enter said slot, and fastening means connecting said tooth to said blade.

4. In combination with a blade having a slot therein, a saw tooth having a blade receiving recess therein, a transverse portion integral therewith of a size to freely enter said slot, and fastening means connecting said tooth to said blade.

5. In combination with a blade having a slot therein, a saw tooth having a long side and a short side spaced apart to receive said blade therebetween, a transverse portion carried by said long side a distance greater than the length of said short side, said transverse portion being of a size to freely enter the slot in said blade.

In testimony whereof I affix my signature.

EMANUEL FOERSTER.